United States Patent [19]
Hicok et al.

[11] Patent Number: 5,920,495
[45] Date of Patent: Jul. 6, 1999

[54] PROGRAMMABLE FOUR-TAP TEXTURE FILTER

[75] Inventors: Gary D. Hicok; Jeffery M. Michelsen, both of Mesa, Ariz.

[73] Assignee: Cirrus Logic, Inc., Fremont, Calif.

[21] Appl. No.: 08/856,118

[22] Filed: May 14, 1997

[51] Int. Cl.$^6$ ................................................. G06F 17/00
[52] U.S. Cl. .................. 364/724.05; 345/474; 348/443; 364/724.13; 364/724.16; 382/261
[58] Field of Search ....................... 364/725.05, 724.13, 364/724.16; 382/260–265, 302, 303; 348/614, 443; 345/474

[56] References Cited

U.S. PATENT DOCUMENTS

| 4,703,514 | 10/1987 | Van Der Wal | 382/302 |
|---|---|---|---|
| 4,862,267 | 8/1989 | Gillard | 348/443 |
| 5,359,674 | 10/1994 | Van Der Wal | 382/261 |
| 5,561,617 | 10/1996 | Van Der Wal | 364/724.05 |
| 5,630,043 | 5/1997 | Uhlin | 345/474 |

*Primary Examiner*—Hassan Kizou
*Assistant Examiner*—Douglas S. Lee
*Attorney, Agent, or Firm*—Robert P. Bell; Steven A. Shaw

[57] ABSTRACT

A programmable filter is provided for filtering image or texture map data. A weighting RAM stores weighting data for filtering data in both x and y directions. Different weighting values may be programmed into weighting RAMs to provide different weighting functions and also enable or disable a number of taps within the filter. A weighting value of zero, for example, may disable a particular tap for the filter. In the preferred embodiment, a number of lines in the x direction may be simultaneously weighted and then weighted and combined in the y direction to produce a filtered value within one clock cycle.

7 Claims, 4 Drawing Sheets

Two - Tap (Bi-linear) Filter

PROGRAMMABLE FOUR-TAP TEXTURE FILTER

CROSS-REFERENCE TO RELATED APPLICATIONS

The subject matter of the present application is related to that in co-pending U.S. patent applications Attorney Docket No. CRUS-0083, filed Apr. 23, 1997, entitled "METHOD FOR CONFIGURING A COMPOSITING BUFFER INTO VARIABLE BAND SIZES", and Attorney Docket No. CRUS-0085 filed (date) entitled "**", both of which are incorporated herein by reference.

FIELD OF THE INVENTION

The present invention is related to the field of 2-D and 3-D texture mapping and video scaling and warping in display controllers for use with computer systems. In particular, the present invention is directed toward the use of multi-tap filters for texture mapping, video scaling and warping.

BACKGROUND OF THE INVENTION

Texture mapping is a technique whereby images generated by computer displays maybe made to seem more realistic. In graphics and animation applications (e.g., 2-D and 3-D graphics including games, simulations, and the like) objects may be rendered as two dimensional or three dimensional objects by representing such objects as a collection of polygon shapes.

2-D image mapping or warping may be employed in graphics systems such as the proposed Talisman™ graphics system promoted by Microsoft™. Such a system may utilize affine transformations to rotate BitBlts operations to alter the shape, size, and perspective of objects on a screen.

In video applications, scaling or warping may be achieved using 2-pixel horizontal filters and 3- or 4-line horizontal filters to reduce, enlarge, or otherwise alter a video image.

In three dimensional animation (i.e., "3-D"), such objects may be re-rendered when a user (or player's) position changes, or when the position of an object on the screen changes in order to preserve correct perspective and the like.

However, simple polygon images do not impart the appearance of realism to a game, simulation, or graphic rendering. Texture mapping is a technique whereby stored images of surface textures or appearances may be applied to polygon surfaces to provide an enhanced appearance of realism. Texture mapping is explained in more detail in related co-pending U.S. Pat. No. 5,630,043 issued May 13, 1997 entitled "ANIMATED TEXTURE MAP APPARATUS AND METHOD FOR 3-D IMAGE DISPLAYS" incorporated herein by reference.

A texture map may comprise a pattern, such as a brick pattern or the like, that may be repeated to form a texture image to cover a polygon surface. Texture maps may also represent scanned in photographic images or the like, and may cover an entire polygon surface with or without repetition.

In 3-D animation rendering, however, a polygon image may be continually re-rendered in different positions, perspectives, and sizes, depending upon the orientation of an object on the screen and the perceived distance of the object from the viewer. Thus, texture map data may need to be interpolated to fit to a polygon image. In other words, an individual datum of texture map data may not correspond to one pixel of display data. Thus, individual pixels of display data may need to be interpolated from adjacent datum of texture map data.

Prior art texture mapping engines use various mapping algorithms such as linear, bi-linear, tri-linear, and anisotropic. These various filters are based upon a linear interpolation between a set of texture values and how the sample point relates spatially to the texture values. FIG. 1 is a diagram illustrating the operation of a prior art two-tap (bi-linear) texture map filter used to interpolate texture map data to generate pixel data.

In FIG. 1, sample point P represents a position within a texture map from which pixel data is to be generated. Values Ta, Tb, Tc, and Td represent four adjacent values of texture map (or other) data. Values Ta, Tb, Tc, and Td may represent any of Y, U, or V data, R,G, or B data, or the like. The number of bits and value range for each of values Ta, Tb, Tc, and Td may vary depending upon pixel depth, compression, and the like.

The relative position between sample point P and values Ta, Tb, Tc, and Td may be determined by dimension u horizontally, and dimension v vertically. Using simple two-tap (bi-linear) interpolation, the value for sample point P may be generated from equation 1:

$$P = v*(u*Ta + (1-u)Tb) + (1-v)*(u*Tc + (1-u)Td) \tag{1}$$

Where u and v are between 0 and 1.

Recently, four-tap texture filters have been used for texture mapping. Four-tap filters may utilize four input values from both horizontal and vertical directions to sample up to 16 data values. A four-tap texture filter may produce better interpolation results and reduce the amount of artifacts and the like in the resultant image.

Such four-tap filters have been based upon fixed functions which are symmetrical in both horizontal and vertical directions. These fixed functions define the weighting used along columns and rows to sample the final value, and may comprise, for example, a Gaussian filter. Such filters have been shown to be useful for filtering a previously lossy compressed image or texture.

Video applications are beginning to explore an asymmetrical filtering system wherein the filter is a two-tap filter for horizontal interpolation, but vertically, a three-tap filter may be used to eliminate flicker or interlace effects. In the prior art, separate fixed filtering units are used in each of the above applications (as well as other applications). Thus, each filter is application specific, and separate filters may be required for texture map filters and for video filtering.

Moreover, different types of data may respond better to different filter types. For example, a more equal weighting in a four-tap filter will blur or wash out any high frequency data because of its averaging effect. Such a filtering technique may be useful for images such a cloud textures, where a "soft" look is desirable. Other images may respond better to a two-tap filter with different interpolation techniques for horizontal and vertical functions in order to avoid blurring edges and the like.

In the prior art, to provide such separate filter types for different applications and/or data types may be cumbersome and expensive.

SUMMARY OF THE INVENTION

The present invention provides a general programmable filter which may be optimized for data type, application, speed, or the like. The filter unit supports a multi-tap calculation in both the horizontal and vertical direction. The horizontal tap weights and the vertical tap weights may be programmed separately, allowing for asymmetrical filtering. The ability to program the tap weights allows many functions to be supported. For example, by zeroing out all the weights except the two nearest tap points which are set to one, a linear filter (in that particular direction) may be achieved. If such a technique is applied in both directions, the result is a bi-linear filter.

The programmable filter of the present invention also allows the application or driver software to best optimize the filter for other desired effects. As discussed above, a more equal weighting on a four-tap filter will blur or wash out any high frequency data.

DETAILED DESCRIPTION OF THE INVENTION

Figure 2A:
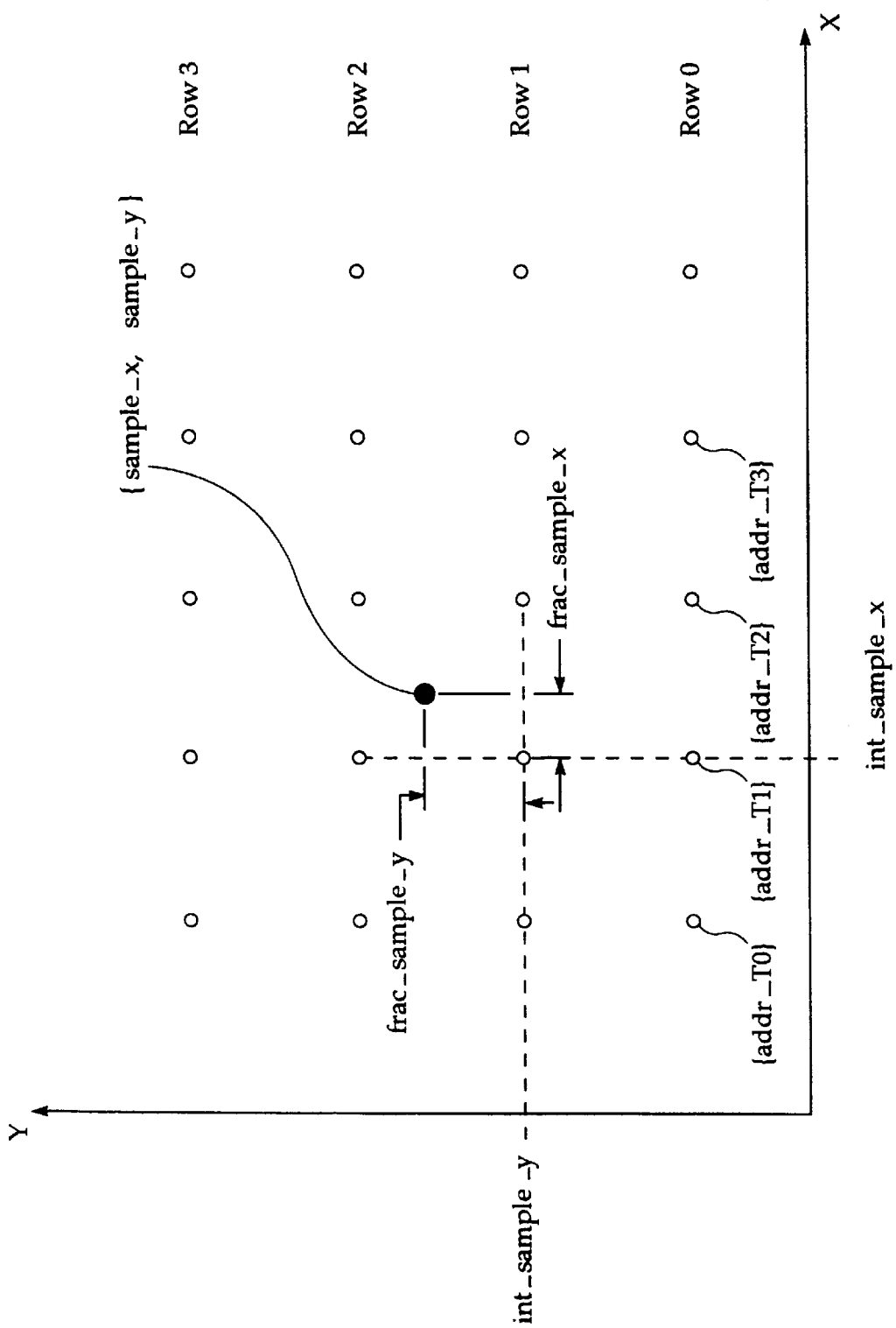
FIG. 2A illustrates the relationship between the sample point and texture map data in the present invention.
Figure 2B:
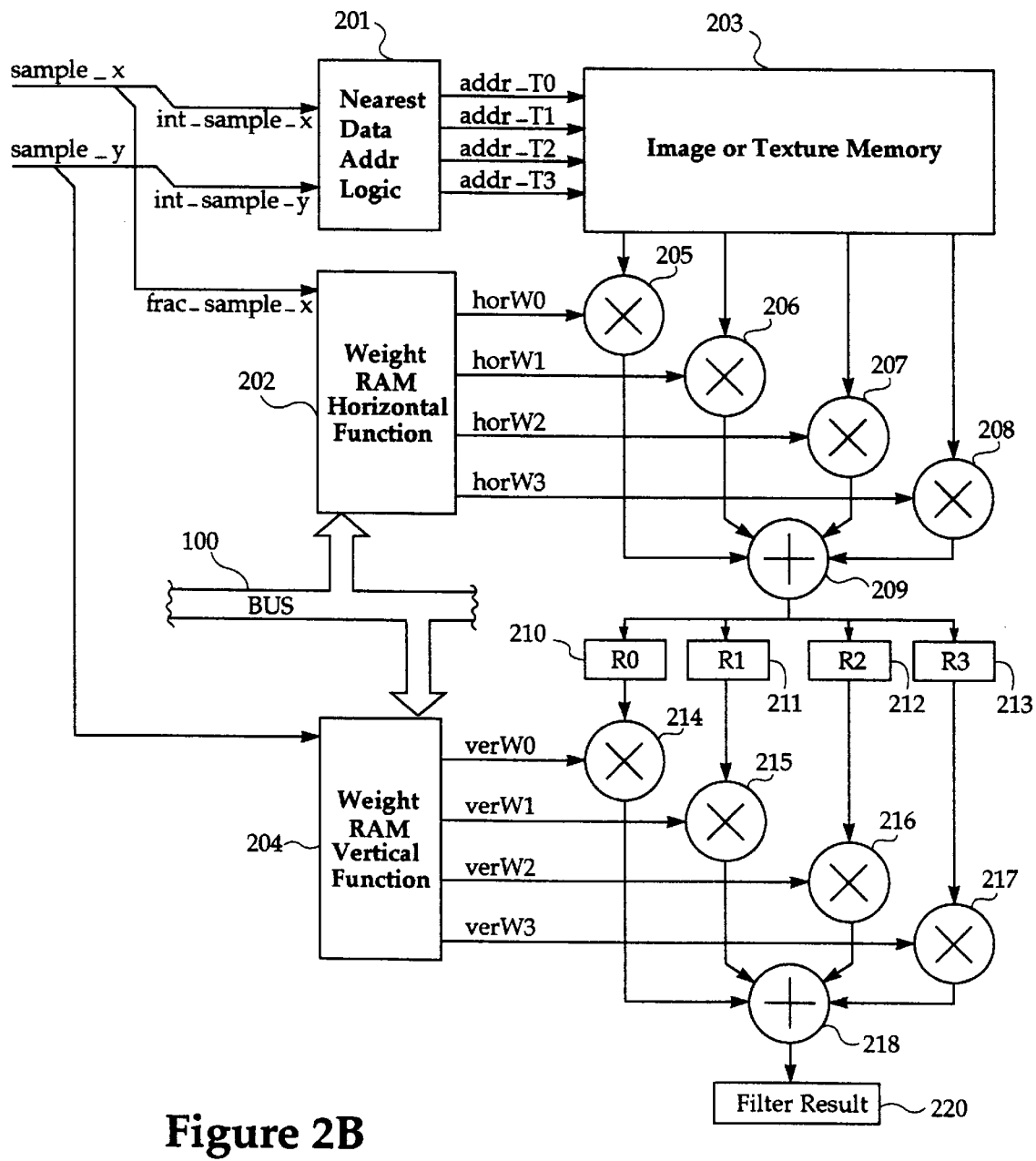
FIG. 2B is a block diagram of a programmable four-tap (or less) filter according to the present invention.

FIG. 2B is a block diagram of a programmable four-tap (or less) filter according to the present invention. Such a programmable filter may be used in a number of applications. However, in the preferred embodiment, the filter of the present invention may be applied as a texture map filter within a display controller for a computer system.

Sample point addresses sample_x and sample_y may be provided as desired location points for a texture map to be generated on a display (i.e., a sample location). As noted above, when displaying texture map data, locations of individual display pixels may not correspond to actual texture map data points. Thus, a texture map filter may be required to generate data for a given sample point. In this instance, sample point addresses sample_x and sample_y represent relative horizontal and vertical locations of a desired sample point within a texture map.

FIG. 2A illustrates mapping from x-y space to sample space. Sample_x and sample_y represent the location of a sample point in x-y space. Sample_x and sample_y have both integer and fraction components as illustrated in FIG. 2A. Integer components, int_sample_x and int_sample_y represent the whole integer value of sample_x and sample_y values. Int_sample_x and int_sample_y may represent the next lowest data value location. Fractional values frac_sample_x and frac_sample_y representing the distance between the next lowest pixel value and adjacent data values in the x and y directions, respectively.

Referring back to FIG. 2B, integer sample values int_sample_x and int_sample_y are fed to nearest data address logic 201 which calculates the addresses of the four data values nearest to the sample point in a particular direction (i.e., x or y). These addresses, addr_T0, addr_T1, addr_T2, and addr_T3 are output from nearest address data logic 201 and are illustrated in FIG. 2A.

In the embodiment of FIG. 2B, the four nearest data points in the x direction are first chosen and their addresses output as addr_T0, addr_T1, addr_T2, and addr_T3 to image or texture memory 203. Image or texture memory 203 then outputs data for the four data points addressed by addresses addr_T0, addr_T1, addr_T2, and addr_T3. Each data output by image or texture memory 203 may represent a color value (e.g., monochrome, or Red, Blue or Green) or luminance or color difference value (e.g., Y, U, or V) for a particular data point of a image or texture. Alternately, the data output may represent, for example, an 8-bit modulation value (such as alpha) used for so-called "Bump Mapping" or "translucency Mapping".

Weight RAM 202 may be fed fractional value frac_sample_x representing the position in the x direction of the sample point between adjacent data points in the image map, as illustrated in FIG. 2B. Weight RAM 202 outputs weighting values horW0, horW1, horW2, and horW3 which weight data values from image or texture memory 203 in multipliers 205, 206, 207, and 208.

The sum of the multiplied values from multipliers 205, 206, 207, and 208 are then summed in adder 209 to produce a weighted value for the first row of x values which are in turn stored in a storage means (e.g., latch, buffer, register, or like) R0. The process is repeated for rows 1–3 to produce four weighted and summed values in storage means 210, 211, 212, and 213.

Once four horizontal rows have been filtered, the resultant values are then filtered vertically. Filtered values R0, R1, R2, and R3 stored in storage means 210, 211, 212, and 213 are multiplied in multipliers 214, 215, 216, and 217 with vertical weighting values verW0, verW1, verW2, and verW3 and added in adder 218 to produce filtered result 220.

Weighting RAM 202 may be programmed via bus 100 to perform different weighting functions or to provide a different number of taps. For example, if weighting values horW0 and horW3 are set to zero, then the apparatus may perform as a two-tap filter in the x direction. Similarly, weighting RAM 204 may be selectively programmed as well. Bus 100 may comprise a system bus within a computer system, or may comprise an internal bus within a device (e.g., multimedia device or the like).

The selectability of weighting RAM programming allows the filter of the present invention to be utilized in a number of different applications. As a result, a single programmable filter may be provided within a semiconductor circuit as a substitute for a number of individual, discrete circuits. Weight RAMs 201 and 202 may be programmed with linear or non-linear curves, which may be addressed using fractional sample values frac_sample_x and frac_sample_y, respectively. In an alternative embodiment, a pair of values may be output from weighting RAMs 210 or 204 for each data value, in order to provide curve fitting for a continuous curve.

Weighting RAMs 202 and 204 may be provided as standard RAMs (e.g., DRAMs or the like) or may be provided within a portion of system memory or other memory.

Figure 1:
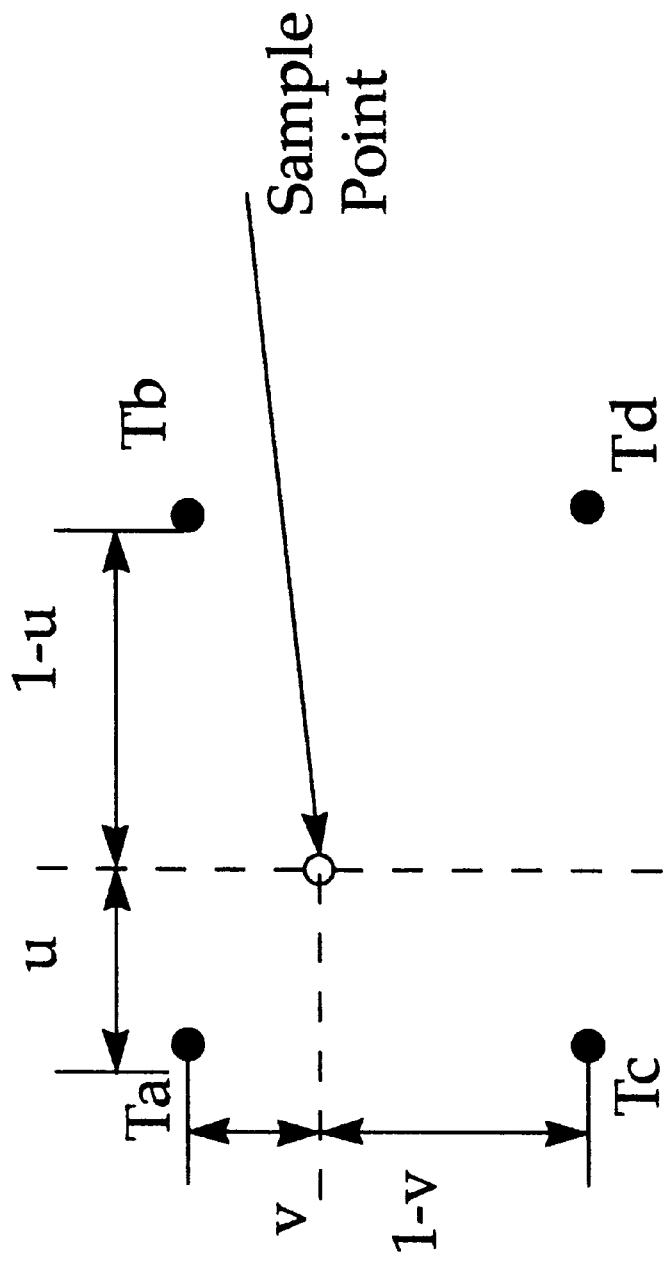
FIG. 1 illustrates the operation of a two-tap (bi-linear) filter.

The embodiment of FIG. 1 is provided for purposes of illustration to allow one to understand the operation of the filter of the present invention. In actual implementation, such an embodiment may not be efficient, as it may require four clock cycles to process four rows of data in the x direction and an additional clock cycle to process the averaged data in the y direction.

Figure 3:
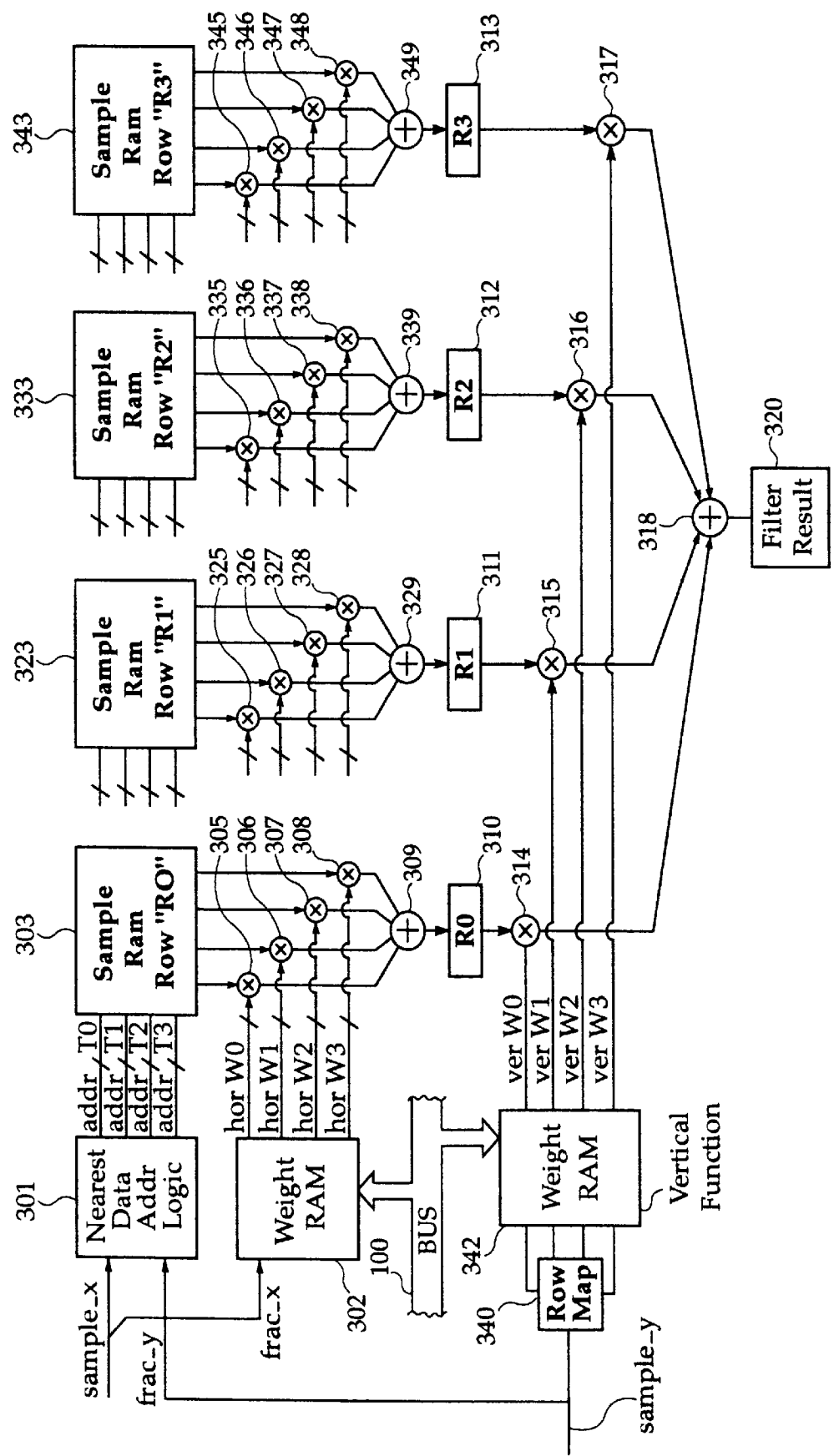
FIG. 3 is a block diagram of a programmable four-tap (or less) filter according to the preferred embodiment of the present invention.

FIG. 3 is a block diagram of the preferred embodiment of the present invention, illustrating a technique whereby filtering may occur within one or two clock cycles. Integer sample values int_sample_x and int_sample_y are fed to nearest data address logic 301 which calculates the addresses of the four data values nearest to the sample point in a particular direction (i.e., x or y). These addresses, addr_T0, addr_T1, addr_T2, and addr_T3 are output from nearest address data logic 301 to image or texture memory portions 303, 323, 333, and 343.

Image or texture memory portion 303 may output data for a first row of data (Row R0), with memory portions 323, 333, and 343, outputting row data for rows R1, R2, and R3, respectively. All three of memory portions 303, 323, 333, and 343 may output their respective row data simultaneously. Weight RAM 302 may be fed fractional value frac_sample_x representing the position in the x direction of the sample point between adjacent data points in the image map, as illustrated in FIG. 2B. Weight RAM 302 outputs weighting values horW0, horW1, horW2, and horW3 which weight data values from image or texture memory 303 in corresponding groups of multipliers 305–308, 325–328, 335,338, and 345–348.

The respective multiplied values from each group of multipliers 305–308, 325–328, 335,338, and 345–348 are then summed respectively in adders 309, 329, 339, and 349 to produce a weighted values R0, R1, R2, and R3 in storage means 310, 311, 312, and 313. Again, the weighting and summing of all four rows of values may take place within one clock cycle, producing four weighed values simultaneously.

Once four horizontal rows have been filtered, the resultant values are then filtered vertically. Filtered values R0, R1, R2, and R3 stored in storage means 310, 311, 312, and 313 are multiplied in multipliers 314, 315, 316, and 317 with vertical weighting values verW0, verW1, verW2, and verW3 and added in adder 318 to produce filtered result 320. Row map 340 may be provided to selectively address weight RAM 342 to insure the correct weighting value is provided to each weight row data R0, R1, R2, and R3.

Weighting RAMs 302 may be programmed via bus 100 to perform different weighting functions or to provide a different number of taps. For example, if weighting values horW0 and horW3 are set to zero, then the apparatus may perform as a two-tap filter in the x direction. Similarly, weighting RAM 342 may be selectively programmed as well. Bus 100 may comprise a system bus within a computer system, or may comprise an internal bus within a device (e.g., multimedia device or the like).

If both horizontal and vertical weighting can occur within one clock cycle, it is possible that the filter of FIG. 3 may operate within one clock cycle, outputting one filtered result per clock cycle in response to an input sample address.

It should be noted that in the preferred embodiment of the present invention, filtering in the x direction is performed first, then filtering in the y direction. Changing filtering order may change the resultant filtering functions, and thus the process may be order dependent. However, it is entirely within the spirit and scope of the present invention to perform filtering first in the y direction and then in the x direction.

In the preferred embodiment, the texture map of the present invention comprises a nominally 4-tap filter. The term "nominally" is used, as the filter of the present invention may be programmed to operate as a 4 by 4 tap filter, a 4 by 2 tap filter, 2 by 2 filter, and the like, by use of the programmable features of the present invention. Although the texture map of the present invention comprises a nominally 4-tap filter, the apparatus of the present invention may be expanded to other sizes (e.g., 16-tap, 32-tap, of the like) without departing from the spirit and scope of the present invention.

Although the present invention has been illustrated and described in detail, it is clearly understood that the same is by way of illustration and example only and is not to be taken by way of limitation, the scope and spirit of the present invention being limited only the terms of the appended claims.

What is claimed is:

1. A programmable filter comprising:

address translation logic, for receiving an input sample point location and outputting address data for a predetermined number of nearest data points in a predetermined direction;

a first memory, coupled to the address translation logic, for storing data points and for receiving address data from the address translation logic, and outputting data corresponding to the predetermined number of nearest data points;

a selectively programmable second memory, receiving at least a portion of the input sample location, for receiving and storing weighting data and outputting a number of weighting values corresponding to at least some of the predetermined number of nearest data points;

a first weighting means, coupled to the first memory and the selectively programmable second memory, for weighting each of the data corresponding to the predetermined number of nearest data points with a corresponding weighting value from the selectively programmable second memory and for outputting first weighted data values;

first summing means, coupled to the first weighting means, for summing the first weighted data values and outputting a summed weighted data value;

wherein said programmable filter generates a plurality of summed weighted data values corresponding to a second predetermined number of data lines in a direction orthogonal to the predetermined direction;

a selectively programmable third memory, receiving at least a portion of the input sample location, for receiving and storing weighting data and outputting weighting values for each of the plurality of summed weighted data values; and second weighting means, coupled to said first weighting means and the selectively programmable third memory, for weighting each of the plurality of summed weighted data values with a corresponding weighting value from the selectively programmable third memory and for outputting second weighted data values.

2. The programmable filter of claim 1, further comprising:

second summing means, coupled to the second weighting means, for summing the second weighted data values and outputting a filtered value.

3. The programmable filter of claim 2, wherein the data points comprise data points of image data and the sample point location comprises a location for which data is to be interpolated.

4. A method for filtering data comprising the steps of:

receiving an input sample point location, generating, in an address translation logic, outputting address data for a predetermined number of nearest data points in a predetermined direction, storing data points in a first memory coupled to the address translation logic, receiving, in the first memory, address data from the address translation logic, outputting, from the first memory, data corresponding to the predetermined number of nearest data points, selectively programming a second memory with weighting data, receiving at least a portion of the input sample location in the second memory, outputting, from the second memory, a number of weighting values corresponding to at least some of the predetermined number of nearest data points, weighting each of the data corresponding to the predetermined number of nearest data points with a corresponding weighting value from the selectively programmable second memory and outputting first weighted data values, summing the first weighted data values to output a summed weighted data value, wherein a plurality of summed weighted data values are generated corresponding to a second predetermined number of data lines in a direction orthogonal to the predetermined direction, selectively programming a third memory with weighting values, receiving, in the third memory, at least a portion of the input sample location, outputting, from the third memory, weighting values for each of the plurality of summed weighted data values, and weighting each of the plurality of summed weighted data values with a corresponding weighting value from the selectively programmable third memory and outputting second weighted data values.

5. The method of claim 4, further comprising the step of:

summing the second weighted data values to output a filtered value.

6. A programmable filter comprising:

address translation logic, for receiving an input sample point location and outputting address data for a predetermined number of nearest data points in a predetermined direction;

a plurality of first memory portions, coupled to the address translation logic, each first memory portion storing data points for a corresponding predetermined number of nearest data lines in a direction orthogonal to the predetermined direction, each of the plurality of first memory portions for receiving address data from the address translation logic, and outputting data corresponding to a predetermined number of nearest data points for one of said predetermined number of nearest data lines;

a selectively programmable second memory, receiving at least a portion of the input sample location, for receiving and storing weighting data and outputting a number of weighting values corresponding to at least some of the predetermined number of nearest data points;

a first weighting means, coupled to the plurality of first memory portions and the selectively programmable second memory, for weighting each of the data corresponding to the predetermined number of nearest data points for each of the predetermined number of nearest data lines with a corresponding weighting value from the selectively programmable second memory and for outputting first weighted data values;

first summing means, coupled to the first weighting means, for summing the first weighted data values and outputting a summed weighted data value for each of the predetermined number of nearest data lines;

a selectively programmable third memory, receiving at least a portion of the input sample location, for receiving and storing weighting data and outputting weighting values for each summed weighted data value for each of the predetermined number of nearest data lines;

second weighting means, coupled to said first weighting means and the selectively programmable third memory, for weighting each summed weighted data value for each of the predetermined number of nearest data lines with a corresponding weighting value from the selectively programmable third memory and for outputting second weighted data values; and second summing means, coupled to the second weighting means, for summing the second weighted data values and outputting a filtered value.

7. A method for filtering data comprising the steps of:

receiving an input sample point location, generating, in an address translation logic, outputting address data for a predetermined number of nearest data points in a predetermined direction, storing, in a plurality of first memory portions, data points for a corresponding predetermined number of nearest data lines in a direction orthogonal to the predetermined direction, receiving, in each of the plurality of first memory portions, address data from the address translation logic, outputting, from the plurality of first memory portions, data corresponding to the predetermined number of nearest data points for one of said predetermined number of nearest data lines, selectively programming a second memory with weighting data, receiving at least a portion of the input sample location in the second memory, outputting, from the second memory, a number of weighting values corresponding to at least some of the predetermined number of nearest data points, weighting each of the data corresponding to the predetermined number of nearest data points for each of the predetermined number of nearest data lines with a corresponding weighting value from the selectively programmable second memory and outputting first weighted data values, summing the first weighted data values to output a summed weighted data value for each of the predetermined number of nearest data lines, selectively programming a third memory with weighting values, receiving, in the third memory, at least a portion of the input sample location, outputting, from the third memory, weighting values for each summed weighted data value for each of the predetermined number of nearest data lines, weighting each summed weighted data value for each of the predetermined number of nearest data lines with a corresponding weighting value from the selectively programmable third memory and outputting second weighted data values, and summing the second weighted data values to output a filtered value.

* * * * *